US006389882B1

(12) United States Patent
Ohkuma

(10) Patent No.: US 6,389,882 B1
(45) Date of Patent: May 21, 2002

(54) APPARATUS AND METHOD FOR DIAGNOSING LEAKAGE IN FUEL VAPOR TREATMENT APPARATUS

(75) Inventor: Shigeo Ohkuma, Atsugi (JP)

(73) Assignee: Unisia Jecs Corporation, Kanagawa (JP)

( * ) Notice: Subject to any disclaimer, the term of this patent is extended or adjusted under 35 U.S.C. 154(b) by 0 days.

(21) Appl. No.: 09/598,976

(22) Filed: Jun. 21, 2000

(30) Foreign Application Priority Data

Jun. 30, 1999 (JP) .......................................... 11-185488

(51) Int. Cl.[7] ................................................ G01M 3/04
(52) U.S. Cl. ......................... 73/49.7; 73/118.1; 73/49.2
(58) Field of Search .............................. 73/49.7, 118.1; 123/520; 702/51

(56) References Cited

U.S. PATENT DOCUMENTS

| | | | | | |
|---|---|---|---|---|---|
| 5,390,645 | A | * | 2/1995 | Cook et al. | 123/520 |
| 5,495,749 | A | * | 3/1996 | Dawson et al. | 73/49.7 |
| 5,499,613 | A | * | 3/1996 | Bayerle et al. | 123/520 |
| 5,572,981 | A | * | 11/1996 | Pfleger et al. | 123/698 |
| 5,679,890 | A | * | 10/1997 | Shinohara et al. | 73/118.1 |
| 5,890,474 | A | * | 4/1999 | Schnaibel et al. | 123/520 |
| 5,975,062 | A | * | 11/1999 | Bonse et al. | 123/519 |
| 6,073,487 | A | * | 6/2000 | Dawson | 73/118.1 |
| 6,082,189 | A | * | 7/2000 | Bayerle et al. | 73/118.1 |
| 6,089,081 | A | * | 7/2000 | Cook et al. | 73/118.1 |
| 6,112,728 | A | * | 9/2000 | Schwegler et al. | 123/520 |
| 6,119,663 | A | * | 9/2000 | Okuma | 123/520 |
| 6,131,448 | A | * | 10/2000 | Hyodo et al. | 73/118.1 |
| 6,161,423 | A | * | 12/2000 | Okuma | 73/40 |
| 6,182,642 | B1 | * | 2/2001 | Ohkuma | 123/520 |
| 6,321,728 | B1 | * | 11/2001 | Ohkuma | 123/520 |

FOREIGN PATENT DOCUMENTS

JP 5-215020 8/1993

* cited by examiner

*Primary Examiner*—Hezron Williams
*Assistant Examiner*—C D Garber
(74) *Attorney, Agent, or Firm*—McDermott, Will & Emery

(57) ABSTRACT

According to the invention, after the engine is ceased, an air pump is turned on, and pressurized air is supplied through a switching valve from a new air introduction opening of a canister to a purge line communicating a fuel tank and a purge control valve. Then, after a predetermined time has passed, an operation current value of said air pump is measured as a leak level. When the leak level is equal to or below a determination level, occurrence of leakage is diagnosed. When the operation current value of the pump is equal to or above an upper limit side predetermined value while the pump performs pressurization, the pressurization by the air pump is ceased so as to prevent the inner pressure of the tank from rising. When the operation current value of the pump is equal to or below a lower limit side predetermined value, the pressurization is also ceased, so as to prevent fuel leakage.

13 Claims, 5 Drawing Sheets

APPARATUS AND METHOD FOR DIAGNOSING LEAKAGE IN FUEL VAPOR TREATMENT APPARATUS

FIELD OF THE INVENTION

The present invention relates to a leakage diagnosis apparatus and a leakage diagnosis method for a fuel vapor treatment apparatus in an automotive internal combustion engine.

DESCRIPTION OF THE RELATED ART

Heretofore, with a fuel vapor treatment apparatus in an internal combustion engine, fuel vapor generated in a fuel tank is introduced to a canister for temporary adsorption, and then the fuel vapor adsorbed in the canister is sucked, together with the new air introduced from a new air introduction opening, through a purge control valve to an intake system of the internal combustion engine. Thereby, the fuel vapor is prevented from being diffused to the outer air (refer for example to Japanese Unexamined Patent Publication No. 5-215020).

According to the above-mentioned apparatus, if a cracking occurs to the piping of a purge line communicating the fuel tank to the purge control valve via the canister, or a sealing error occurs to the joining portion of the piping, the fuel vapor is likely to leak. As a result, diffusion preventing effects can not be sufficiently achieved.

Therefore, as a leakage diagnosis apparatus for diagnosing whether leakage of fuel vapor from the purge line occurs or not, the following method has been proposed.

That is, after the engine is stopped, a drive load (pump operation current value) of an electric air pump utilized as a pressurized air supply device is detected when releasing pressurized air to the atmosphere through a reference orifice having a reference bore, to set a determination level. On the other hand, the drive load (pump operation current value) of the air pump when supplying pressurized air from the air pump to the purge line through the new air introduction opening of the canister is measured as a leak level. The leak level is compared with the determination level, and when the leak level is lower than the determination level, occurrence of leakage is diagnosed.

According to the above method, even when a small amount of leakage occurs through a very fine hole being formed to the piping, the leakage may be diagnosed with high accuracy.

However, the above diagnosis method had drawbacks (1) and (2).

(1) When a large amount of fuel vapor is generated in the fuel tank, due to high fuel temperature inside the fuel tank or large amount of volatile component in the fuel, the pressure rise caused by the fuel vapor is added to the pressure component provided by the air pump. As a result, the pressure inside the fuel tank may exceed the initially expected pressure. This causes excessive load to the fuel tank, which leads to deterioration of endurance of the tank, including fatigue failure.

(2) When a large hole is formed to the fuel tank and the like, the pressurization by the air pump may cause leakage of fuel including the fuel vapor. Further, when a filler cap of the fuel tank is opened during fuel supply to the tank, the pressurization by the air pump may cause fuel vapor to diffuse through an oil filler port.

The present invention aims at solving the above drawbacks. The object of the present invention is to provide a leakage diagnosis apparatus and a leakage diagnosis method for a fuel vapor treatment apparatus, which solves disadvantages caused by the supply of pressurized air during leakage diagnosis.

SUMMARY OF THE INVENTION

The present invention relates to a leakage diagnosis apparatus of a fuel vapor treatment apparatus, for diagnosing leakage of fuel vapor from a purge line communicating a fuel tank to a purge control valve via a canister, the fuel vapor treatment apparatus introducing fuel vapor from the fuel tank to the canister having a new air introduction opening for temporarily adsorption, and supplying the fuel vapor adsorbed to the canister, together with the new air introduced from the new air introduction opening through the purge control valve, to an intake system of an internal combustion engine, said leakage diagnosis apparatus comprising a pressurized air supply device for supplying pressurized air to the purge line through the new air introduction opening of the canister while the engine is stopped, a leak level measurement device for measuring a drive load of the pressurized air supply device as a leak level, at a measurement timing after maintaining a pressurized air supply state by the pressurized air supply device for a predetermined time, and a leakage determination device for determining whether leakage occurs or not based on the leak level.

Here the present invention is characterized in that the above leakage diagnosis apparatus includes a pressurized air supply ceasing device for ceasing an operation of the pressurized air supply device when the drive load of the pressurized air supply device is not within a predetermined range.

When the drawback explained in (1) occurs, the drive load of the pressurized air supply device exceeds an upper limit side predetermined value. When the drawback explained in (2) occurs, the drive load of the pressurized air supply device becomes smaller than a lower limit side predetermined value. Therefore, according to the invention, the supply of pressurized air is ceased when the drive load is not within the predetermined range.

Accordingly, in a case where a large amount of fuel vapor is generated in the fuel tank and the pressure rise caused by the fuel vapor is added to the pressure component provided by the pressurized air supply device so that the pressure inside the fuel tank may exceed the initially expected pressure, the drive load of the pressurized air supply device is detected to have reached the upper limit side predetermined value or above, and the operation of the pressurized air supply device is ceased. Thereby, deterioration of endurance, including fatigue failure, of the fuel tank caused by excessive load can be prevented.

Further, when a large hole is formed to the fuel tank, the pressurization provided by the pressurized air supply device may cause leakage of fuel including fuel vapor. Moreover, when a filler cap of the fuel tank is opened during fuel supply to the fuel tank, the pressurization may cause fuel vapor to diffuse through the oil filler port. In such cases, the drive load of the pressurized air supply device is detected to have reached the lower limit side predetermined value or less, and the operation of the pressurized air supply device is ceased. Thereby, fuel is prevented from leaking.

Moreover, the present invention includes a warning device which, when the operation of the pressurized air supply device is ceased, provides a warning of such state.

Preferably, the warning device separates the state where the drive load is equal to or above the upper limit side predetermined value from the state where the drive load is equal to or below the lower limit side predetermined value, to provide a warning, for the upper limit side predetermined value and the lower limit side predetermined value which define the predetermined range. Thereby, the rising of inner pressure of the tank may be separated from the fuel leakage, to be warned Further, the present invention includes a determination level setting device for detecting the drive load of the pressurized air supply device when the pressurized air from the pressurized air supply device is released to the atmosphere through a reference orifice having a reference bore, to set a determination level. The leak level is compared with the determination level by the leakage determination device to determine whether leakage occurs or not. Thereby, the accuracy of leakage diagnosis is improved.

In a case of such a determination level, the predetermined range may be set based on the determination level, so as to determine more precisely whether to perform the pressurization or not.

Further, according to the present invention, the pressurized air supply device is an electric air pump, and the drive load of the pump is detected through a pump operation current value. This enables easy and accurate leakage diagnosis or determination on whether or not to perform the pressurization, without the need to add a pressure sensor and the like.

These and other objects and phases of the present invention will become apparent from the following explanations disclosing the preferred embodiments of the invention with reference to the accompanied drawings.

DETAILED DESCRIPTION OF THE PREFERRED EMBODIMENT

A preferred embodiment of the present invention will now be explained.

Figure 1:
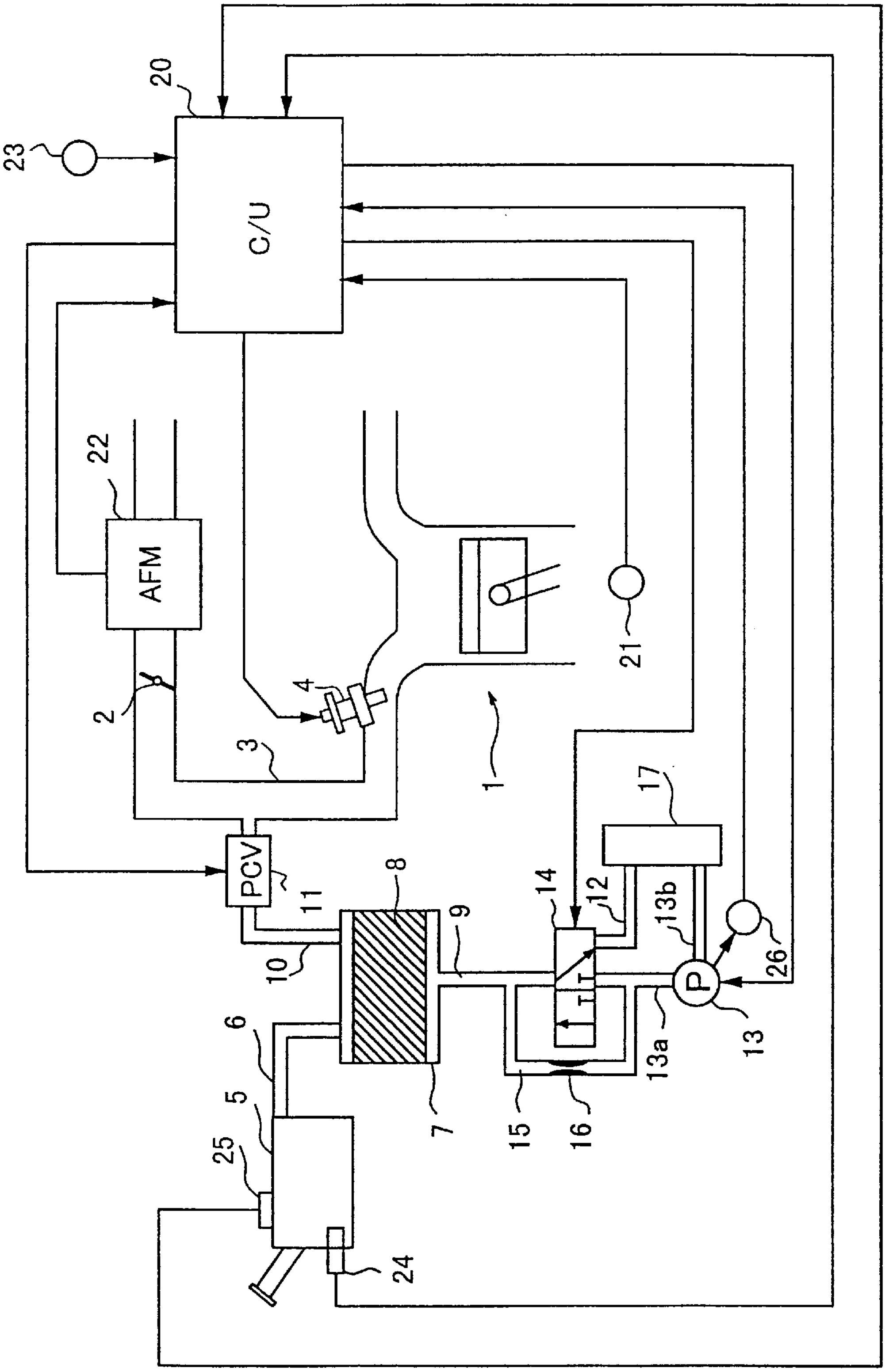
FIG. 1 is a system diagram showing one embodiment of the present invention.

FIG. 1 is a system diagram showing one embodiment of the present invention.

An intake system of an internal combustion engine 1 is equipped with a throttle valve 2 so that an intake air quantity of the engine is controlled. An electromagnetic fuel injection valve 4 is mounted for each cylinder in a manifold portion of an intake pipe 3 positioned downstream of the throttle valve 2. The fuel injection valve 4 is opened by a drive pulse signal output from a control unit 20 in synchronism with the engine rotation, and performs fuel injection. The injected fuel is combusted in a combustion chamber of the engine 1.

A canister 7 is provided as a fuel vapor treatment apparatus, which introduces therein fuel vapor generated in a fuel tank 5 through a fuel vapor introduction passage 6 and adsorbs the fuel vapor temporarily. The canister 7 is formed by filling an adsorbent 8, such as activated carbon, into a container.

A new air introduction opening 9 is formed to the canister 7, and a purge passage 10 extends out from the canister 7. The purge passage 10 is connected via a purge control valve 11 to the intake pipe 3 positioned downstream of the throttle valve 2. The purge control valve 11 is driven to open by a signal output from the control unit 20.

Therefore, the fuel vapor generated in the fuel tank 5 during engine stop and the like is introduced through the fuel vapor introduction passage 6 to the canister 7, and adhered thereto. When the engine 1 is started and predetermined purge approval conditions are fulfilled, the purge control valve 11 is opened, and then the intake negative pressure of the engine 1 acts on the canister 7, As a result, the fuel vapor adsorbed by the canister 7 is desorbed by the new air being introduced from the new air introduction opening 9. A purge gas including the desorbed fuel vapor is sucked through the purge passage 10 into the intake pipe 3. Thereafter, the purge gas is treated to be combusted in the combustion chamber of the engine 1.

A leakage diagnosis apparatus for the fuel vapor treatment apparatus includes the following devices placed to the side of the new air introduction opening 9 of the canister 7.

An atmosphere release opening 12 and an electric air pump 13 that acts as a pressurized air supply device are provided. An electromagnetic switching valve 14 is provided to selectively connect the new air introduction opening 9 of the canister 7 to the atmosphere release opening 12 and a discharge opening 13*a* of the air pump 13. A bypass passage 15 is formed, which connects the discharge opening 13*a* of the air pump 13 to the new air introduction opening 9 of the canister 7, bypassing the switching valve 14. A reference orifice 16 having a reference bore (for example, 0.5 mm) is formed to the bypass passage 15. An air filter 17 is equipped to the atmosphere release opening 12 and an intake opening 13*b* of the air pump 13.

The switching valve 14 is switched to the side of the atmosphere release opening 12 in its off-state, and switched to the side of the air pump 13 in its on-state. Normally, the valve is in the off-state being switched to the side of the atmosphere release opening 12, thereby communicating the new air introduction opening 9 of the canister 7 to the atmosphere release opening 12.

The control unit 20 is equipped with a microcomputer including a CPU, a ROM, a RAM, an A/D converter, and an input/output interface and the like. Signals from various sensors are input to the control unit 20.

Various sensors include a crank angle sensor 21 capable of detecting engine rotation speed by outputting crank angle signals in synchronism with the rotation of the engine 1, an air-flow meter 22 for measuring the intake air quantity, a vehicle speed sensor 23 for detecting the vehicle speed, a fuel temperature sensor 24 for detecting the temperature of the fuel inside the fuel tank 5, and a tank remainder sensor 25 for detecting a quantity of remaining fuel inside the fuel tank 5. Moreover, a current sensor 26 acting as a detecting device for detecting a drive load (pump operation current value) of the air pump 13 is equipped for detecting the operation current value of the air pump 13.

Here the control unit 20 controls the operation of the fuel injection valve 4 based on engine operating conditions, and controls the operation of the purge control valve 11 based on the engine operating conditions. Moreover, the control unit performs leakage diagnosis of the fuel vapor treatment apparatus by controlling the operations of the air pump 13 and the switching valve 14, which constitute the leakage diagnosis apparatus, after the engine stop.

In order to perform leakage diagnosis of the fuel vapor treatment apparatus, the control unit 20 is equipped with functions as a determination level setting device, a leak level measurement device, a leakage determination device, a pressurized air supply ceasing device and a warning device, all in forms of software.

Figure 2:
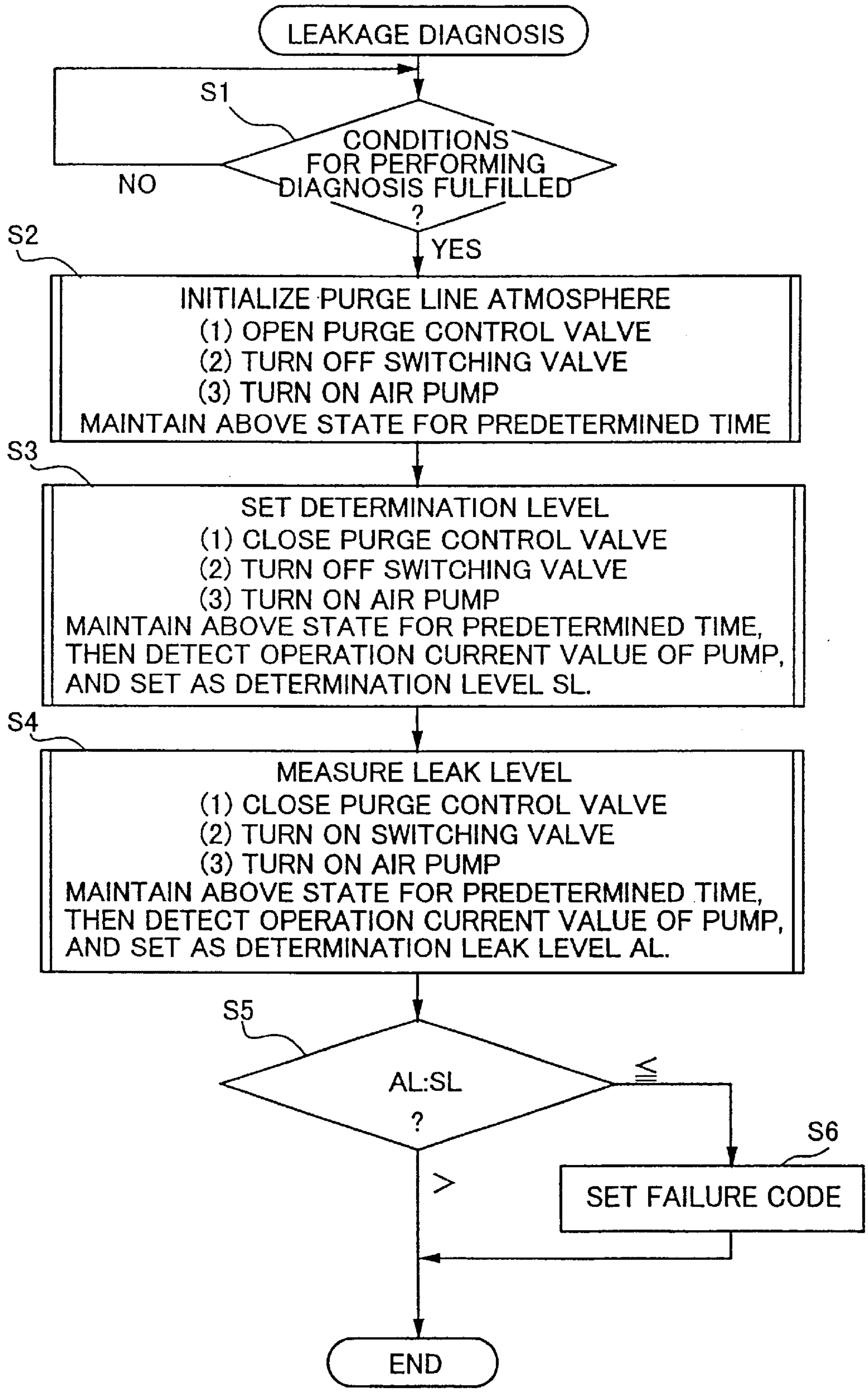
FIG. 2 is a flowchart showing the leakage diagnosis.

Next, the leakage diagnosis of the fuel vapor treatment apparatus by the control unit 20 is explained with reference to the flowchart of FIG. 2. The present flow is started after on-off of an engine key switch.

In step 1 (denoted as S1 in the drawings. Likewise for all steps), determination is made on whether or not predetermined conditions for performing the diagnosis, actually, all the following conditions (1) to (5), are fulfilled:

(1) engine rotation speed≦predetermined value;

(2) vehicle speed≦predetermined value;

(3) purge control valve 11 is diagnosed as functioning normally (not malfunctioning) by a fault diagnosis routine performed in another procedure;

(4) fuel temperature≦predetermined value; and (5) lower limit side predetermined value≦remaining fuel in tank≦upper limit side predetermined value.

When it is determined that all the above conditions for performing the diagnosis are fulfilled, the procedure is advanced to step 2.

In step 2, the purge line atmosphere is initialized. Actually, the purge control valve 11 is opened, the switching valve 14 is turned off and switched to the side of the atmosphere release opening 12, and the air pump 13 is turned on. This state is maintained for a predetermined time.

Figure 4:
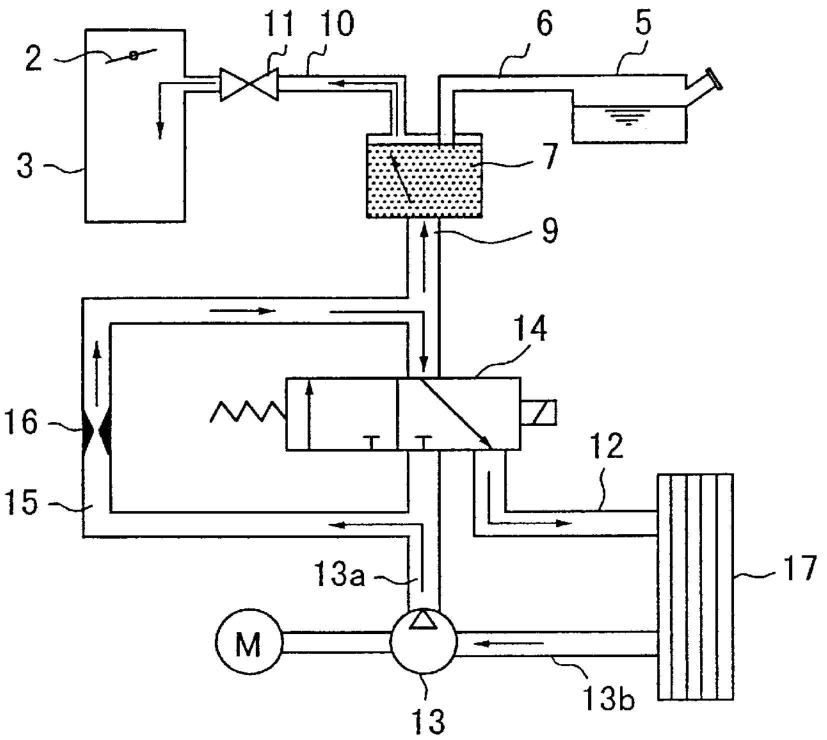
FIG. 4 is a diagram showing the flow of air when the purge line atmosphere is initialized.

At this time, as shown in FIG. 4, the air being sucked in the air pump 13 and pumped out from the air pump 13 travels through the bypass passage 15, enters the canister 7 through the new air introduction opening 9 and travels through the canister 7, and then flows into the intake pipe 3 via the purge control valve 11 of the purge passage 10. Further, a part of the air travels through the bypass passage 15 and flows back through the switching valve 14, and is discharged to the atmosphere through the atmosphere release opening 12.

As a result, the residual pressure (negative pressure) and the residual gas within the purge passage 10 is removed.

Next, in step 3, the determination level for leakage diagnosis is set. Actually, the purge control valve 11 is closed, the switching valve 14 is turned off and switched to the side of the atmosphere release opening 12, and the air pump 13 is turned on. This state is maintained for a predetermined time.

Figure 5:
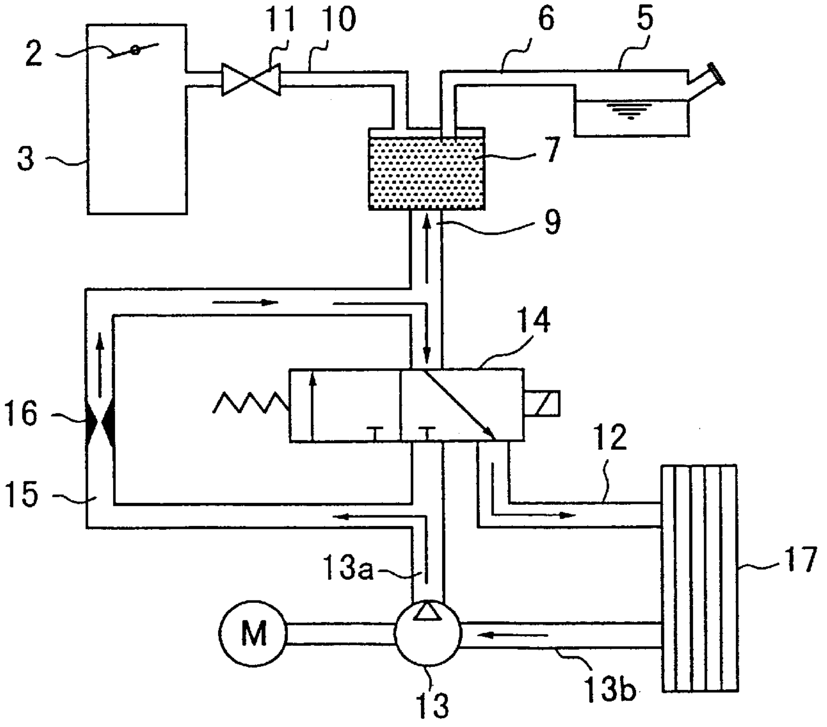
FIG. 5 is a diagram showing the flow of air when the determination level is set.

At this time, as shown in FIG. 5, the air sucked in the air pump 13 and pumped out by the air pump 13 travels through the bypass passage 15 (reference orifice 16), then flows back through the switching valve 14, and is discharged to the atmosphere from the atmosphere release opening 12.

The operation current value of the air pump 13 after maintaining the above state for a predetermined time is detected by the current sensor 26 to be set as a determination level SL. In other words, the operation current value of the air pump 13 when the air pressurized and sent from the air pump 13 is released to the atmosphere via the reference orifice 16 having a reference bore is set as the determination level SL. This portion corresponds to a determination level setting device.

Next, in step 4, a leak level measurement is carried out. Actually, the purge control valve 11 is closed, the switching valve 14 is turned on and switched to the side of the air pump 13, and the air pump 13 is turned on. Then, this state is maintained for a predetermined time.

Figure 6:
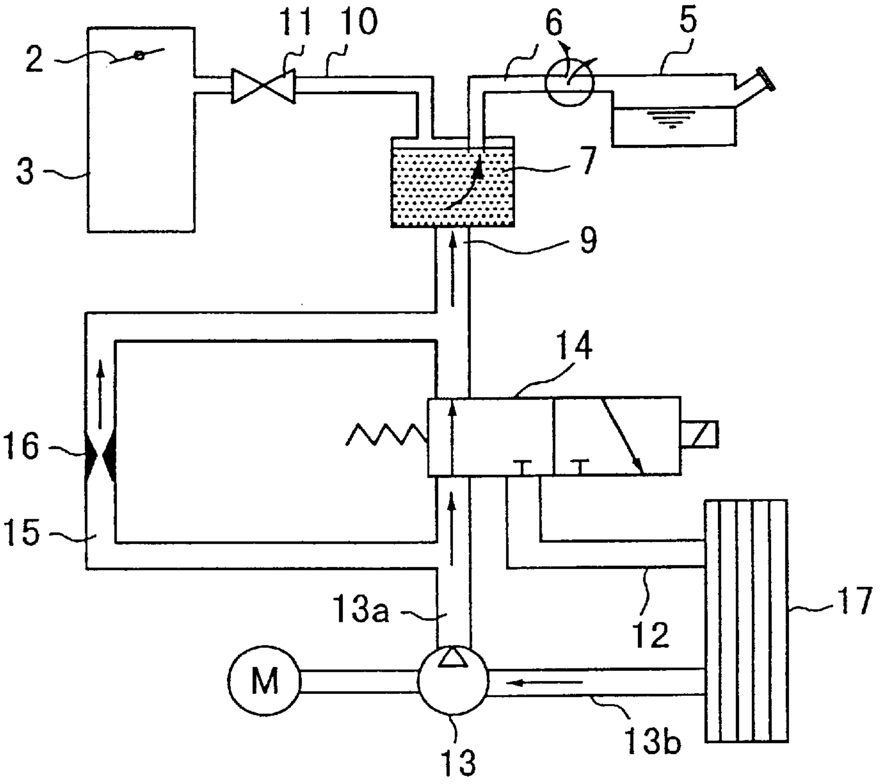
FIG. 6 is a diagram showing the flow of air when the leakage level is measured.

At this time, as shown in FIG. 6, the air being sucked in the air pump 13 and pumped out from the air pump 13 travels through the switching valve 14, enters the canister 7 through the new air introduction opening 9, and flows into the purge line (6, 10), which communicates the fuel tank 5 via the canister 7 to the purge control valve 11.

The operation current value of the air pump 13 after maintaining the above state for a predetermined time is measured by the current sensor 26 to be set as a leak level AL. In other words, the operation current value of the air pump 13 when supplying the air pressurized and sent from the air pump 13 to the purge line is measured as the leak level AL. This portion corresponds to a leak level measurement device.

Next, in step 5, the leak level (operation current value) AL measured in step 4 is compared with the determination level SL set in step 3, so as to perform leakage diagnosis of the fuel vapor. In other words, when the operation current value is determined to be equal to or below the determination level, it is diagnosed that leakage occurs. After setting a predetermined failure code in step 6, the present flow is terminated. When the operation current value is determined to be greater than the determination level, it is diagnosed that no leakage occurs, and the present flow is terminated.

In other words, if the operation current value of the air pump 13 when measuring the leak level is smaller than the operation current value needed for the pressurized air sent out from the air pump 13 to pass through the reference orifice 16 having a reference bore, that is, if the drive load of the air pump 13 is decreased, it is diagnosed that there is caused a failure equivalent to a case where a hole larger than the reference bore is opened to the purge line (6, 10) to occur leakage of the determination level or above. If not, it is diagnosed that no leakage occurs (normal). This portion corresponds to a leakage determination device.

As above, the present invention is equipped with: the switching valve 14 connecting the new air introduction opening 9 of the canister 7 to either the atmosphere release opening 12 or the discharge opening 13*a* of the electric air pump 13 selectively; and the bypass passage 15 which extends from the discharge opening 13*a* of the air pump 13 to the new air introduction opening 9 of the canister 7 bypassing the switching valve 14 and is provided with the reference orifice 16 having a reference bore. The present invention is also equipped with: the determination level setting device which detects the operation current value of the air pump 13 to set the determination level in a state that the air pump 13 is turned on and at the same time the switching valve 14 is switched to the side of the atmosphere release opening 12, the air pumped out from the air pump 13 travels through the reference orifice 16 within the bypass passage 15 and then released to the atmosphere from the release opening 12 via the switching valve 14; the leak level measurement device which measures the operation current value of the air pump 13 as the leak level, at a measurement timing after maintaining for a predetermined time a state where the air pump 13 is turned on, and at the same time the switching valve 14 is switched to the air pump 13, and the air pumped out from the air pump 13 is supplied via the switching valve 14 and the new air introduction opening 9 of the canister 7 to the purge line (6, 10); and the leakage determination device which compares the leak level with the determination level to determine whether leakage occurs or not. Thereby, a good leak diagnosis can be executed.

However, if the amount of fuel vapor generated within the fuel tank 5 may be large due to the high temperature of the fuel within the fuel tank 5 or a large portion of volatile component within the fuel, the pressure rise caused by the fuel vapor is added to the pressure component provided by the air pump 13, so that the pressure within the fuel tank 5 may exceed an initially expected pressure. This causes an excessive load to the fuel tank 5, and may result in deterioration of endurance of the tank, including fatigue failure.

Moreover, if a large hole is formed to the fuel tank 5, the pressure added by the air pump 13 may cause leakage of fuel including fuel vapor. When a filler cap is opened during fuel supply to the fuel tank, the pressure added by the air pump 13 may cause fuel vapor to be diffused from an oil filler port.

Figure 3:
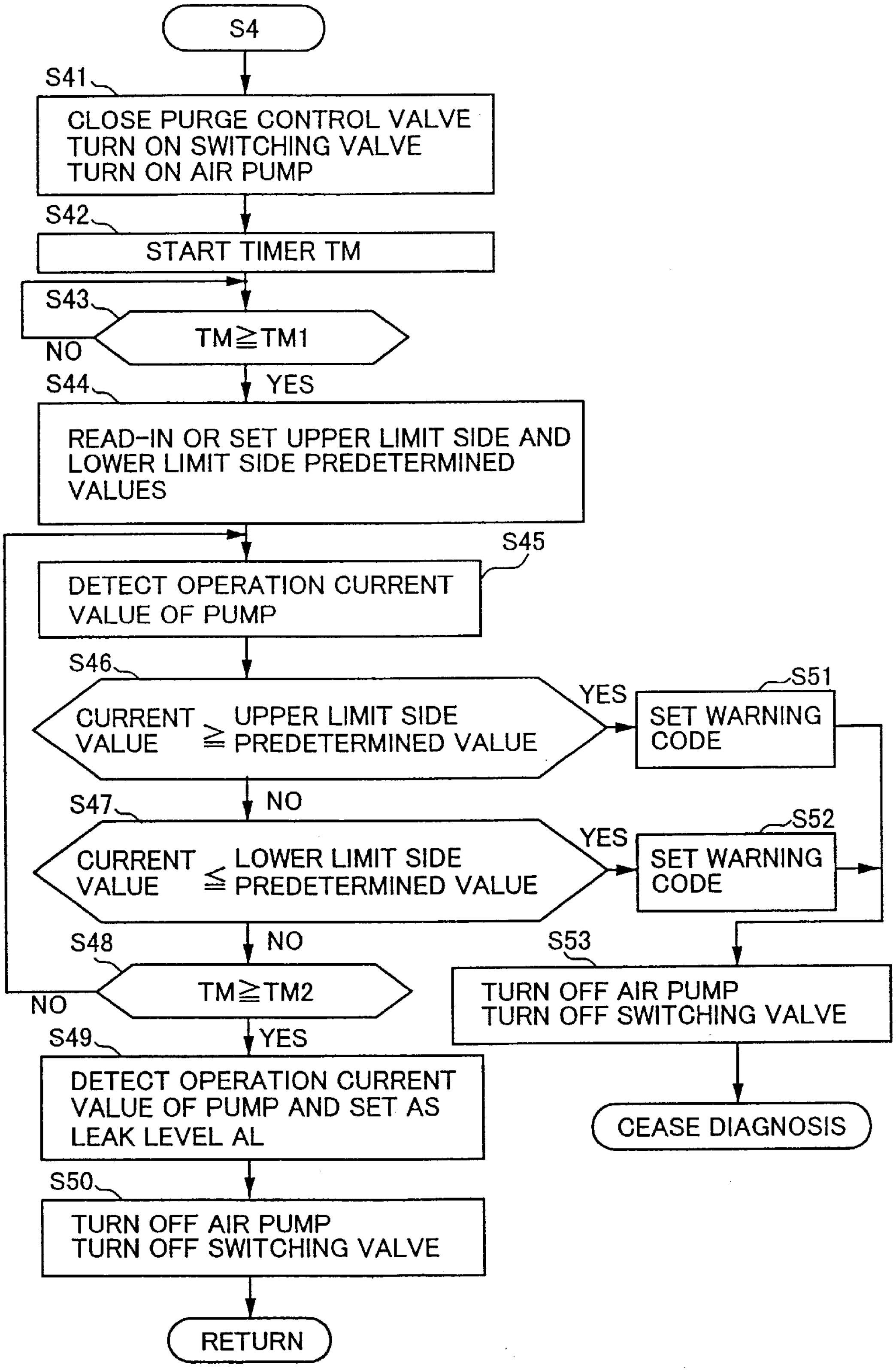
FIG. 3 is a flowchart showing the details of the leakage level measurement steps.

Therefore, the leak level measurement in step 4 is performed according to the flowchart of FIG. 3. When the predetermined conditions are fulfilled, the pressurization by the air pump 13 (leakage diagnosis) is suspended so as to avoid the above problems.

The leak level measurement according to the flow of FIG. 3 will now be explained.

In step 41, the purge control valve 11 is closed, the switching valve 14 is turned on and switched to the side of the air pump 13, and the air pump 13 is turned on.

In step 42, a timer TM is started.

In step 43, the value of the timer TM is compared with a predetermined time TM1. A stand-by state is maintained until the value TM becomes equal to or greater than TM1 (TM≧TM1), and when TM becomes equal to or greater than TM1 (TM≧TM1), the procedure is advanced to step 44.

In step 44, the upper limit side predetermined value and the lower limit side predetermined value for the operation current value of the air pump 13 are read-in from data stored in advance, or set based on the determination level SL. In case the values are set based on the determination level SL, a predetermined value is added to the determination level SL to set the upper limit side predetermined value, and a predetermined value is subtracted from the determination level SL to set the lower limit side predetermined value. This portion corresponds to a predetermined range (upper limit side predetermined value and lower limit side predetermined value) setting device.

In step 45, the current sensor 26 detects the operation current value of the air pump 13.

In step 46, the detected operation current value of the air pump 13 is compared with the upper limit side predetermined value. When the operation current value is equal to or greater than the upper limit side predetermined value (operation current≧upper limit side predetermined value), the procedure is advanced to step 51, where a warning failure code for warning such state is set. Then, in step 53, the air pump 13 is turned off to cease the pressurization, and the switching valve 14 is turned off and switched to the atmosphere release opening 12 side. Thereby, the leakage diagnosis is ceased.

When a large amount of fuel vapor is generated in the fuel tank 5 and the rising of pressure caused by the fuel vapor is added to the pressure provided by the air pump 13 so that the pressure inside the fuel tank 5 may exceed the initially expected pressure, the operation current value of the air pump 13 is detected to become equal to or greater than the upper limit side predetermined value, and the operation of the air pump 13 is ceased, to thereby provide a warning of the rise in the inner pressure of the tank by the warning code while avoiding the deterioration of endurance of the fuel tank 5 including fatigue failure caused by excessive load added to the tank.

In step 47, the detected operation current value of the air pump 13 is compared with the lower limit side predetermined value. When the operation current value is equal to or smaller than the lower limit side predetermined value (operation current≦lower limit side predetermined value), then the procedure is advanced to step 52, where a warning code for warning such state is set. Then, in step 53, the air pump 13 is turned off to cease the pressurization, and the switching valve 14 is turned off and switched to the atmosphere release opening 12 side. Thereby, the leakage diagnosis is ceased.

In other words, if a large hole is formed to the fuel tank 5 and the like, the pressure provided by the air pump 13 may cause leakage of fuel including fuel vapor. When a filler cap is opened during supply of fuel to the fuel tank, the pressure provided by the air pump may cause fuel vapor to be diffused from the oil filler port. In such a case, the operation current value of the air pump 13 is detected to be equal to or smaller than the lower limit side predetermined value, and the operation of the air pump 13 is ceased, to thereby provide a warning of fuel leakage by the warning code while preventing fuel from leaking.

Steps 44, 45, 46, 47 and 53 correspond to a pressurized air supply ceasing device, and steps 51 and 52 correspond to a warning device.

In step 48, the value of the timer TM is compared with a predetermined time TM2 (>TM1). The procedures of steps 45 through 47 are repeated until the value TM is equal to or greater than TM2 (TM≧TM2), and when TM is equal to or greater than TM2, the procedure is advanced to step 49.

In step 49, the operation current value of the air pump 13 at that time is measured by the current sensor 26, and the value is set as a leak level AL.

Then, in step 50, the air pump 13 is turned off, the switching valve 14 is turned off and switched to the atmosphere release opening 12 side, and the leak level measurement is terminated.

Figure 7:
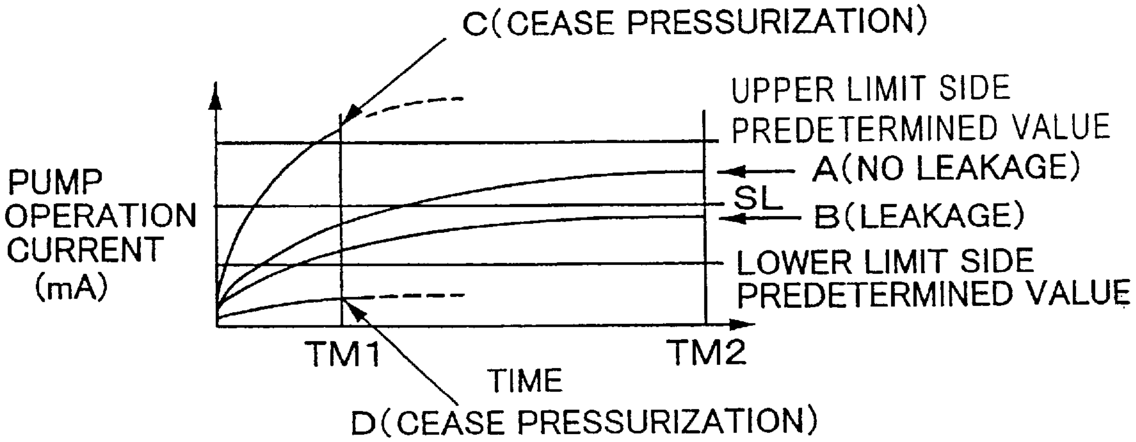
FIG. 7 is a diagram showing the time-variation of a pump operation current value when the leak level is measured.

As above, with reference to FIG. 7, the operation current value of the air pump 13 is measured as the leak level AL at a measurement timing after the predetermined time TM2 has passed from the starting of pressurization by the air pump 13, to be compared with the determination level SL. When AL is higher than SL (AL>SL) as shown in A, no leakage is diagnosed. When AL is equal to or lower than SL (AL≦SL) as shown in B, it is diagnosed that leakage occurs.

On the other hand, the operation current value of the pump is continuously monitored after the predetermined time TM1 (which is shorter than the predetermined time TM2) has passed from the starting of pressurization by the air pump 13. When, as shown in C, the operation current value of the air pump 13 is equal to or greater than the upper limit side predetermined value (>SL), there is fear that the inner pressure of the tank may rise, so the air pump 13 ceases. pressurization. When, as shown in D, the operation current value of the air pump 13 is equal to or smaller than the lower limit side predetermined value (<SL), there is a possibility of fuel leakage, so the air pump 13 ceases pressurization.

As explained in the above, according to the present invention, the operation of the pressurized air supply device is ceased, when a large amount of fuel vapor is generated in the fuel tank and the rising of pressure caused by the fuel vapor is added to the pressure provided by the pressurized air supply device, so that the pressure inside the fuel tank rises excessively, thereby enabling to avoid the deterioration of endurance of the fuel tank including fatigue failure caused by excessive load added to the fuel tank. Moreover, when a large hole is formed to the fuel tank that may cause fuel leakage (including fuel vapor) by the pressurization of air, the operation of the pressurized air supply device is ceased, thereby enabling to prevent the leakage of fuel. Therefore, the industrial applicability of the present invention can be highly achieved.

I claim:

1. A leakage diagnosis apparatus of a fuel vapor treatment apparatus, for diagnosing leakage of fuel vapor from a purge line communicating a fuel tank to a purge control valve via a canister, said fuel vapor treatment apparatus introducing fuel vapor from said fuel tank to said canister having a new air introduction opening for temporary adsorption, and supplying fuel vapor that is adsorbed by said canister, together with new air introduced from said new air introduction opening through said purge control valve, to an intake system of an internal combustion engine, said leakage diagnosis apparatus comprising:

a pressurized air supply device for supplying pressurized air to said purge line through said new air introduction opening of said canister while said engine is ceased;

a leak level measurement device for measuring a drive load of said pressurized air supply device as a leak level, at a measurement timing after maintaining a pressurized air supply state by said pressurized air supply device for a predetermined time; and a leakage determination device for determining whether leakage occurs or not based on said leak level by comparing said leak level with a predetermined determination level, and further comprising a pressurized air supply ceasing device for ceasing an operation of said pressurized air supply device before leakage determination by said leakage determination device, when the drive load of said pressurized air supply device becomes equal to or above an upper limit side predetermined value set in advance to be greater than said determination level or becomes equal to or below a lower limit side predetermined value set in advance to be smaller than said determination level before reaching of said measurement timing after initiation of pressurized air supply by said pressurized air supply device.

2. A leakage diagnosis apparatus of a fuel vapor treatment apparatus according to claim 1, further comprising a warning device for, when the operation of said pressurized air supply device is ceased, providing a warning of the fact that the operation of said pressurized air supply device is ceased.

3. A leakage diagnosis apparatus of a fuel vapor treatment apparatus according to claim 2, wherein said warning device separates the state where said drive load is equal to or above said upper limit side predetermined value from the state where said drive load is equal to or below said lower limit side predetermined value, to provide a warning.

4. A leakage diagnosis apparatus of a fuel vapor treatment apparatus according to claim 1, further comprising a determination level setting device for detecting the drive load of said pressurized air supply device when the pressurized air from said pressurized air supply device is released to the atmosphere through a reference orifice having a reference bore, to set a determination level, wherein said leak level is compared with said determination level by said leakage determination device to determine whether leakage occurs or not.

5. A leakage diagnosis apparatus of a fuel vapor treatment apparatus according to claim 4, wherein said upper limit side predetermined value and said lower limit side predetermined value are set based on said determination level.

6. A leakage diagnosis apparatus of a fuel vapor treatment apparatus according to claim 1, wherein said pressurized air supply device is an electric air pump, and the drive load thereof is detected through an operation current value of said pump.

7. A leakage diagnosis apparatus of a fuel vapor treatment apparatus, for diagnosing leakage of fuel vapor from a purge line communicating a fuel tank to a purge control valve via a canister, said fuel vapor treatment apparatus introducing fuel vapor from said fuel tank to said canister having a new air introduction opening for temporary adsorption, and supplying fuel vapor that is adsorbed by said canister, together with new air introduced from said new air introduction opening through said purge control valve, to an intake system of an internal combustion engine, said leakage diagnosis apparatus comprising:

a pressurized air supply means for supplying pressurized air to said purge line through said new air introduction opening of said canister while said engine is ceased;

a leak level measurement means for measuring a drive load of said pressurized air supply means as a leak level, at a measurement timing after maintaining a pressurized air supply state by said pressurized air supply means for a predetermined time; and a leakage determination means for determining whether leakage occurs or not based on said leak level by comparing said leak level with a predetermined determination level, and further comprising a pressurized air supply cease means for ceasing an operation of said pressurized air supply means before leakage determination by said leakage determination means, when the drive load of said pressurized air supply means becomes equal to or above an upper limit side predetermined value set in advance to be greater than said determination level or becomes equal to or below a lower limit side predetermined value set in advance to be smaller than said determination level before reaching of said measurement timing after initiation of pressurized air supply by said pressurized air supply means.

8. A leakage diagnosis method of a fuel vapor treatment apparatus, for diagnosing leakage of fuel vapor from a purge line communicating a fuel tank to a purge control valve via a canister, said fuel vapor treatment apparatus introducing fuel vapor from said fuel tank to said canister having a new air introduction opening for temporary adsorption, and supplying fuel vapor that is adsorbed by said canister, together with new air introduced from said new air introduction opening through said purge control valve, to an intake system of an internal combustion engine, said leakage diagnosis method comprising the steps of:

supplying pressurized air to said purge line through said new air introduction opening of said canister while said engine is ceased;

measuring a drive load for supplying said pressurized air as a leak level, at a measurement timing after maintaining a pressurized air supply state for a predetermined time; and determining whether leakage occurs or not based on a comparison between said leak level and a predetermined determination level, and further comprising the step of setting in advance an upper limit side predetermined value greater than said determination level and a lower limit side predetermined value smaller than said determination level;

ceasing supply of said pressurized air before leakage determination when the drive load for supplying said pressurized air becomes equal to or above said upper limit side predetermined value or becomes equal to or below said lower limit side predetermined value before reaching of said measurement timing after initiation of said supply of pressurized air.

9. A leakage diagnosis method of a fuel vapor treatment apparatus according to claim 8, further comprising the step of providing, when the pressurized air supply is ceased, a warning of the fact that said pressurized air supply device is ceased.

10. A leakage diagnosis method of a fuel vapor treatment apparatus according to claim 9, wherein said warning step separates the state where said drive load is equal to or above said upper limit side predetermined value from the state where said drive load is equal to or below said lower limit side predetermined value, to provide a warning.

11. A leakage diagnosis method of a fuel vapor treatment apparatus according to claim 8, further comprising the step of setting a determination level by detecting the drive load for supplying the pressurized air when the pressurized air is released to the atmosphere through a reference orifice having a reference bore, wherein when determining leakage, said leak level is compared with said determination level to determine the occurrence of leakage.

12. A leakage diagnosis method of a fuel vapor treatment apparatus according to claim 11, wherein said upper limit side predetermined value and said lower limit side predetermined value are set based on said determination level.

13. A leakage diagnosis method of a fuel vapor treatment apparatus according to claim 8, wherein said pressurized air is supplied by an electric air pump, and the drive load of said air pump is detected through an operation current value of said pump.

* * * * *